(12) United States Patent
Knight et al.

(10) Patent No.: US 8,499,986 B2
(45) Date of Patent: Aug. 6, 2013

(54) QUICK-RELEASE ARRANGEMENT

(75) Inventors: Jonathan Arnold Manley Knight, London (GB); Barry Howard Lee, Rayleigh (GB)

(73) Assignee: Hultafors Group AB, Bollebygd (SE)

( * ) Notice: Subject to any disclaimer, the term of this patent is extended or adjusted under 35 U.S.C. 154(b) by 777 days.

(21) Appl. No.: 10/514,507

(22) PCT Filed: Aug. 1, 2002

(86) PCT No.: PCT/GB02/03547
§ 371 (c)(1),
(2), (4) Date: Nov. 15, 2004

(87) PCT Pub. No.: WO03/096839
PCT Pub. Date: Nov. 27, 2003

(65) Prior Publication Data
US 2005/0145656 A1   Jul. 7, 2005

(30) Foreign Application Priority Data

May 16, 2002   (GB) .................................. 0211231.6

(51) Int. Cl.
*A45F 5/00* (2006.01)
(52) U.S. Cl.
USPC ............ 224/197; 224/666; 224/271; 224/904
(58) Field of Classification Search
USPC ................. 224/195, 197, 217, 271, 929, 930, 224/666–669, 904; 455/351
See application file for complete search history.

(56) References Cited

U.S. PATENT DOCUMENTS

| 1,519,380 | A |   | 12/1924 | Kochanski |
|---|---|---|---|---|
| 2,543,313 | A |   | 2/1951 | Dietzgen |
| 3,261,519 | A |   | 7/1966 | Horne |
| 3,370,236 | A |   | 2/1968 | Walker |
| 3,743,147 | A |   | 7/1973 | Wilczynski |
| 3,878,589 | A |   | 4/1975 | Schaefer |
| 4,419,794 | A |   | 12/1983 | Hornton et al. |
| 4,479,596 | A |   | 10/1984 | Swanson |
| 4,598,027 | A | * | 7/1986 | Johnson ..................... 428/542.8 |
| 4,676,420 | A | * | 6/1987 | Sharp ........................... 224/271 |
| 4,718,586 | A |   | 1/1988 | Hagino |
| 4,754,528 | A | * | 7/1988 | Lyons et al. .................. 24/3.12 |
| 4,819,847 | A | * | 4/1989 | Anderson ..................... 224/669 |
| 4,858,798 | A |   | 8/1989 | Siddoway |
| 4,929,116 | A |   | 5/1990 | Mahl |
| 5,014,892 | A |   | 5/1991 | Copeland |
| 5,016,326 | A |   | 5/1991 | Goldenberg |
| 5,025,966 | A | * | 6/1991 | Potter .......................... 224/183 |

(Continued)

FOREIGN PATENT DOCUMENTS

| CN | 2417003 Y | 1/2001 |
|---|---|---|
| DE | 4015091 A1 | 1/1991 |
| EP | 0 456 589 A2 | 11/1991 |
| EP | 0 683 587 A1 | 11/1995 |

*Primary Examiner* — Justin Larson
(74) *Attorney, Agent, or Firm* — Dentons US LLP

(57) ABSTRACT

A quick-release arrangement for a hand-held device (30) comprising a belt clip (10) and an engagement element (20), wherein the belt clip is adapted to fit on a user's belt or waistband, the engagement element is attachable to a hand-held device, and the belt clip has a retaining portion (17, 18) shaped to slidably accept the engagement element to a limit point and to form an interference fit with the engagement element at said limit point.

13 Claims, 3 Drawing Sheets

U.S. PATENT DOCUMENTS

| | | | |
|---|---|---|---|
| 5,054,170 A * | 10/1991 | Otrusina | 24/580.11 |
| 5,201,858 A * | 4/1993 | Otrusina | 24/573.11 |
| 5,213,240 A * | 5/1993 | Dietz et al. | 224/183 |
| 5,230,159 A | 7/1993 | Lipsey | 33/760 |
| 5,253,292 A * | 10/1993 | Fluder et al. | 379/426 |
| 5,480,115 A * | 1/1996 | Haltof | 248/221.11 |
| 5,528,770 A * | 6/1996 | Castilla et al. | 340/7.63 |
| 5,577,303 A | 11/1996 | Sacks et al. | |
| 5,584,423 A * | 12/1996 | Wang | 224/197 |
| 5,597,102 A * | 1/1997 | Saarikko et al. | 224/197 |
| 5,622,296 A | 4/1997 | Pirhonen et al. | |
| 5,664,292 A * | 9/1997 | Chen | 24/3.11 |
| 5,730,342 A * | 3/1998 | Tien | 224/271 |
| 5,850,954 A * | 12/1998 | Dong-Joo | 224/197 |
| 5,850,996 A * | 12/1998 | Liang | 248/221.11 |
| 5,898,647 A * | 4/1999 | Goradesky | 368/83 |
| 5,957,421 A | 9/1999 | Barbour | |
| 5,995,622 A * | 11/1999 | Roussy et al. | 379/446 |
| 5,996,184 A * | 12/1999 | Mah et al. | 24/3.12 |
| 6,098,858 A * | 8/2000 | Laugesen | 224/197 |
| 6,141,417 A * | 10/2000 | Lopez et al. | 379/446 |
| 6,176,401 B1 * | 1/2001 | Lim | 224/196 |
| D443,199 S * | 6/2001 | Swanson | D8/373 |
| 6,283,348 B1 * | 9/2001 | Wang | 224/271 |
| 6,364,184 B1 | 4/2002 | Hauk et al. | |
| 6,443,340 B1 * | 9/2002 | Chung et al. | 224/197 |
| 6,722,539 B2 * | 4/2004 | Iitsuka | 224/197 |
| 6,824,028 B2 * | 11/2004 | Mutai et al. | 224/271 |
| 6,955,279 B1 * | 10/2005 | Mudd et al. | 224/197 |
| 6,955,280 B2 * | 10/2005 | Saitoh et al. | 224/269 |
| 7,070,049 B2 * | 7/2006 | Lee et al. | 206/349 |
| 2002/0170933 A1 * | 11/2002 | Martin | 224/197 |

* cited by examiner

QUICK-RELEASE ARRANGEMENT

FIELD OF THE INVENTION

This invention relates to a quick-release arrangement for a hand-held device, in particular hand tools.

BACKGROUND OF THE INVENTION

It has become commonplace for hand-held devices to have a belt clip to enable them to be clipped onto the user's belt or waistband when not in use, so as to be stored in a convenient location for when they are needed. Such belt clips take a similar form whatever the nature of the hand held device. They comprise a clip part which is resiliently biased against a wall of the hand-held device, such that a belt or waistband can be inserted between the clip part and the wall of the hand-held device and held securely between these two parts. In some prior art devices the belt clip is formed from a single piece of spring steel which is bent in two to form two arms, and while one arm of the clip is the clip part, the other arm is fixed securely to the wall of the hand-held device.

These belt clips are difficult to put on and take off the user's belt, and this often requires two hands, which in some situations is not possible, for example, when the user is working on a ladder. Furthermore, they do not provide a reliable grip and can easily be knocked off the user's belt or waistband. Therefore in situations where a secure grip is required they cannot be used, and alternative devices, such as a specially designed belt with one or more pouches, are employed. This problem is particularly acute in the field of hand tools, where a reliable grip during storage is essential for safety reasons. One solution that has been proposed is a magnetic grip, where a strong magnet or steel plate is mounted on a belt clip, and a magnet is securely attached to the hand tool. Although this provides a strong attachment of the hand tool to the user's belt, and has the advantage of the clip remaining on the belt when the hand tool is in use, a major disadvantage is that the measure can be difficult to remove from the belt clip due to the strong attraction between the two magnets or magnet and steel plate. Furthermore, strong magnets are not compatible with a number of other hand-held devices, such as personal tape and MP3 players, and can interfere with medical devices, such as heart pacemakers.

SUMMARY OF THE INVENTION

The present invention is a quick-release arrangement whereby an engagement element on the hand-held device can be slid into a retaining portion of a belt clip, in order to attach the hand-held device to the belt clip and thus also to the user's belt or waistband.

Accordingly the present invention provides a quick-release arrangement for a hand-held device comprising a belt clip and an engagement element, wherein:
- the belt clip is adapted to fit on a user's belt or waistband;
- the engagement element is attachable to a hand-held device; and
- the belt clip has a retaining portion shaped to slidably accept the engagement element to a limit point and to form an interference fit with the engagement element at said limit point.

Preferably the retaining portion has a retaining lip for embracing the engagement element, which itself preferably has a mushroom-shaped cross section, in that it has a head portion and a neck portion which is narrower than the head portion. In this configuration, the retaining lip defines a channel behind it into which the head portion of the engagement element can be inserted. The narrower neck portion of engagement element then abuts the retaining lip.

The interference fit is preferably provided by resilient co-operation between a tooth and a recess, where the tooth is usually on the retaining potion and the recess is in the engagement portion. In one embodiment, the retaining portion preferably includes a release lever (which itself is preferably sprung) for separation of the tooth and the recess to allow removal of the engagement element. It is particularly preferred that the tooth is on this lever and is shaped so as to allow a push fit of the engagement element on insertion to the belt clip, but that the tooth and recess must be separated before the engagement element can be removed. This can be achieved by the tooth having a wedge profile, with the narrow portion of the edge orientated towards the entrance of the engagement element.

It is further preferred that the retaining portion and the engagement element are shaped to allow the engagement element to rotate slidably with respect to the retaining portion and maintain the interference fit between them. This can be achieved by the engagement element being circular when viewed perpendicular to the plane in which it is slidably engaged with the belt clip, and if the retaining portion has a retaining lip then it is U-shaped when viewed in the same direction. Thus at the limit point, the retaining lip, and the channel which it forms, are part circular, with appropriate dimensions relative to the engagement element. When the interference fit is provided by co-operation between a tooth and a recess these are circular.

An advantage of the above construction is that it also enables the engagement element to be removable from and engageable with the retaining portion substantially in any angular orientation (in the plane of slidable engagement) to which the engagement element is rotatable, when engaged with the retaining portion. This makes insertion and removal of the hand-held device simple. The ease of insertion can be aided by the U-shaped lip being broader at the top than lower down at the limit point of engagement.

The quick-release arrangement of the present invention is particularly suited to hand tools, and is preferably applied to tape measures.

BRIEF DESCRIPTION OF THE DRAWINGS

Embodiments of the invention will now be described with reference to the accompanying drawings in which

FIG. 2b is a side view of the belt clip of FIG. 2a;

DETAILED DESCRIPTION

The hand held device (30) is shown in some of the figures as a tape measure, although many other devices are envisaged, including other hand-tools, e.g. hammers, electric drills and personal electronics items, e.g. mobile telephones, personal stereos. In the discussion below, the term measure will be used for convenience.

Figure 1A:
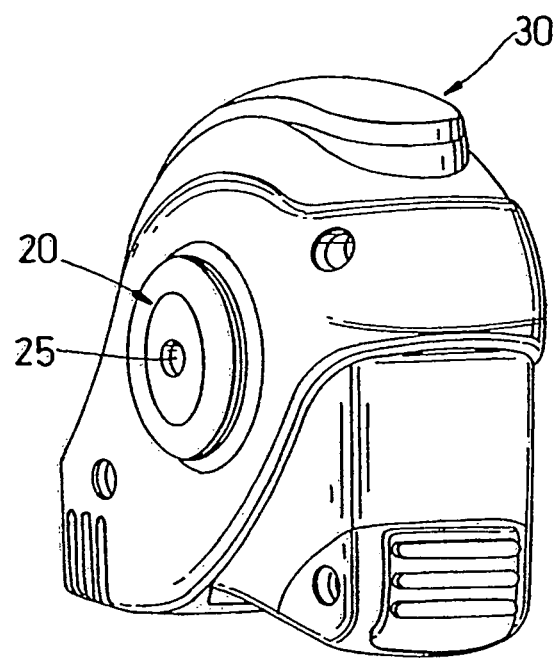
FIG. 1a is a perspective view of a tape measure bearing an engagement element according to the present invention.
Figure 1B:
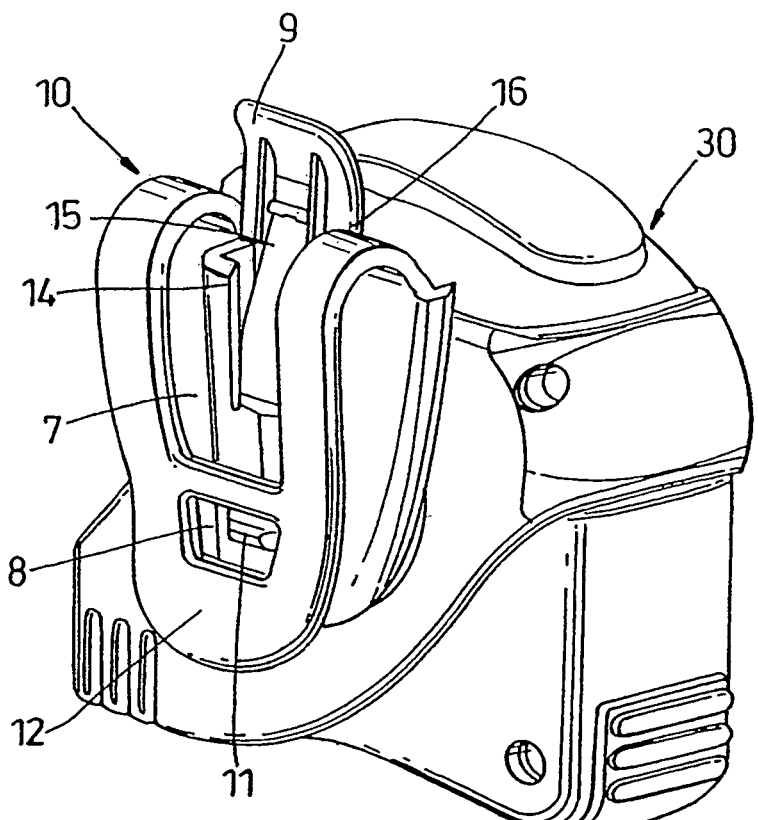
FIG. 1b is a perspective view of the tape measure of FIG. 1b with a belt clip engaged with the engagement element.
Figure 3:
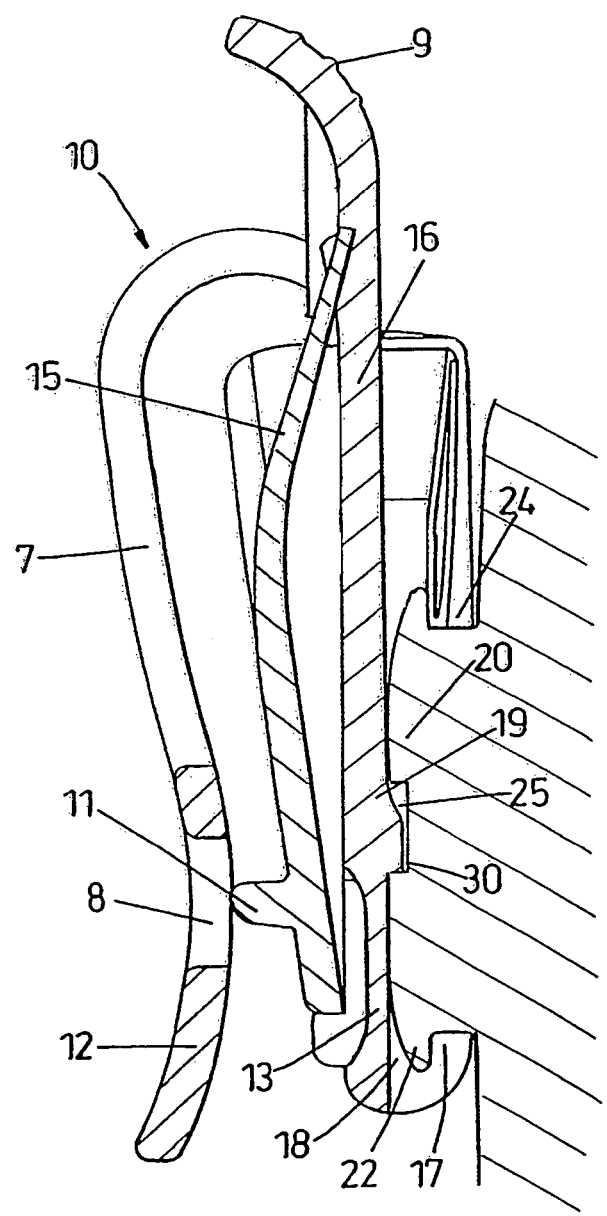
FIG. 3 is cross section through the centre line of the belt clip and measure of FIG. 1b.

As shown in FIG. 1a, the engagement element (20) is secured to the measure (30) by means of a screw in recess (25), which also enables an interference fit with the belt clip (10), see below. Other ways of attaching the element (20) to the measure can be used, for example adhesive or sonic welding, or in some embodiments the engagement element may be moulded as part of the measure. As can be seen in FIG. 3, the engagement element has a mushroom cross-section with a head (22), and a neck (24) which is narrower.

Figure 2A:
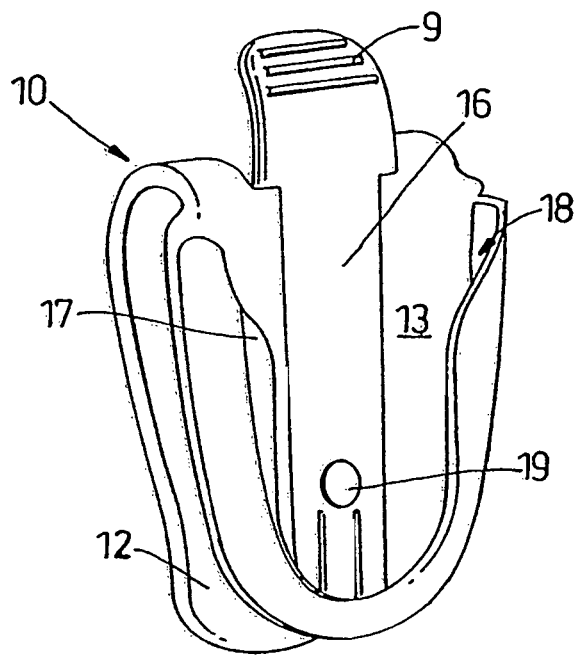
FIG. 2a is a perspective view of the belt clip of FIG. 1a from the side on which the measure is engageable.
Figure 2B:
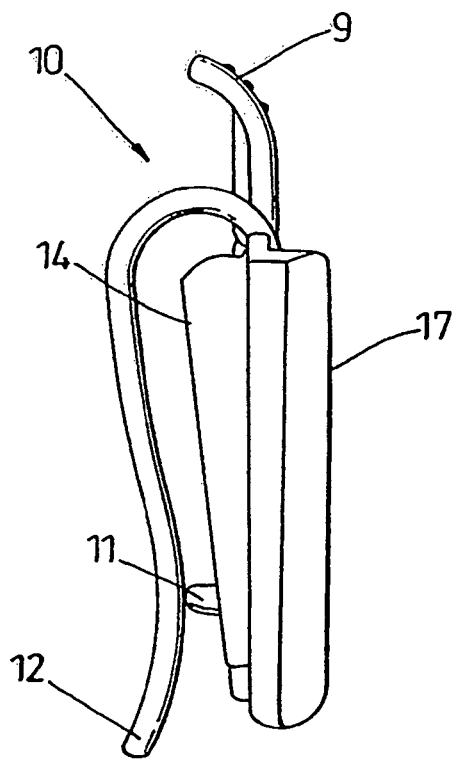

The belt clip (10), shown in FIGS. 2a and 2b not engaged with an engagement element, has a retaining portion made, for example, from acetal, which comprises a retaining lip (17) and a channel (18) formed between the lip and the back plate (13). In the centre of the back plate is a separate portion (16) which bears a wedged tooth (19). The separate portion is a release lever operated by a handle (9), and is biased into alignment with the back plate (13) by a spring (15) moulded as part of the belt clip (10). The release lever (16) can be pulled back against the backstop (14), so as to move the tooth (19) behind the plane of the back plate (13). The release lever (16) is fixed into position at its lower end using a permanent click fit arrangement, and is made from a resilient plastic, for example, acetal, to allow it to bend from its equilibrium position. In alternative embodiments, the release lever need not to be a separate portion, but may be integral with the retaining portion.

The part of the belt clip designed to be clipped onto the user's belt or waistband is similar to known constructions in some respects, although has a number of features which are particular to the invention. It comprises a clip part (12) which is resiliently biased towards the back plate (13). The clip part (12) has two cut-out portions (7, 8) which correspond respectively to the backstop (14) and the lug (11) on the back plate (13). The second cut-out extends far enough to allow unrestricted operation of the handle (9) of the release lever (16), and also simplifies the moulding process.

In use, the user's belt is held securely between the clip part (12) and the backstop (14). The lug (11) is usually positioned under the user's belt to prevent the assembly from slipping off, and to allow the tape measure to be removed from the belt-clip without the clip becoming separated from the user's belt. The lug (11) has a rounded profile on its lower edge to allow it to be easily attached to the belt, but the upper edge is square to make removal more difficult.

FIG. 3 shows a cross section of the belt clip assembly when the engagement element (20) is held in an interference fit in the belt clip (10). The engagement element (20) is seated in the channel (18) formed between the lip (17) and the back plate (13). The interference fit is formed between the recess (25) in the engagement element (20) and the tooth (19) attached to the release lever (16). The lug (19) is shaped such that insertion of the engagement element (20) into the channel (18) forces the release lever (16) back against the bias of spring (15) until the lug (19) is level with the recess (25) when it springs back into the equilibrium position. For removal of the engagement element from the belt clip, the handle (9) is operated to pull the release lever (16) back against the biasing spring (15) releasing the tooth (19) from the recess (25).

Due to the circular nature of the engagement element (20) and the tooth and recess (19,25) the tape measure (30) can be rotated to any position while in the belt clip (10). This allows use of the tape measure "from the hip", i.e. without removal of the measure from the belt clip. Furthermore, this circular nature enables the tape measure to be inserted into the channel at any rotational angle.

The cross-section also shows how lug (11) cooperates with the cut out portion (8) in the clip part (12) in order to provide a secure grip to the user's belt or waistband.

The invention claimed is:

1. A quick-release arrangement for a hand tool comprising a belt clip and an engagement element, wherein:
   the belt clip is adapted to fit on a user's belt or waistband;
   the engagement element is attachable to a hand tool; and
   the belt clip has a retaining portion, the retaining portion comprising a U-shaped retaining lip and a U-shaped channel located behind the retaining lip to slidably accept the engagement element to a limit point and the retaining portion shaped to form an interference fit with the engagement element at said limit point, wherein the limit point is defined by a closed bottom end of the U-shaped channel, and wherein the engagement element is separated from the retaining portion by an upward movement in a direction opposite from that in which it is inserted into the U-shaped channel, wherein the interference fit is provided by resilient co-operation between a tooth and a recess and the retaining portion includes an elongate release lever having a pivot at one end and a handle at the other end, the tooth and recess being located intermediate the two ends of the release lever and the handle being accessible to a user and manually operable to displace the release lever about the pivot and in a direction away from the engagement element for separation of the tooth and the recess to allow removal of the engagement element; and wherein the retaining portion and the engagement element are shaped to allow the engagement element to rotate slidably with respect to the retaining portion and maintain the interference fit between them.

2. A quick-release arrangement according to claim 1, wherein the engagement element has a mushroom-shaped cross section.

3. A quick-release arrangement according to claim 1, wherein the tooth is on the release lever and is shaped so as to allow a push fit of the engagement element on insertion to the belt clip.

4. A quick-release arrangement according to claim 1, wherein the engagement element is removable from and engageable with the retaining portion substantially in any angular orientation in the plane of slidable engagement to which the engagement element is rotatable, when engaged with the retaining portion.

5. The quick-release arrangement according to claim 1, wherein the limit point lies below the retaining lip.

6. A hand tool comprising a quick-release arrangement according to claim 1.

7. A hand tool according to claim 6, wherein the tool is a tape measure.

8. A quick-release arrangement for a hand tool comprising a belt clip and an engagement element, wherein:
   the belt clip is adapted to fit on a user's belt or waistband;
   the engagement element is attachable to a hand tool; and
   the belt clip has a retaining portion, the retaining portion comprising a U-shaped retaining lip and a U-shaped channel located behind the retaining lip to slidably accept the engagement element to a limit point and the retaining portion shaped to form an interference fit with the engagement element at said limit point, wherein the interference fit is provided by resilient co-operation between a tooth and a recess and the retaining portion includes an elongate release lever having a pivot at one end, and a handle at the other end that extends above the belt clip, the tooth and recess being located intermediate the two ends of the release lever and the handle being accessible to a user and manually operable to displace the release lever about the pivot and in a direction away from the engagement element for separation of the tooth and the recess to allow removal of the engagement element.

9. The quick-release arrangement according to claim 8, wherein the retaining portion and the engagement element are shaped to allow the engagement element to rotate slidably with respect to the retaining portion and maintain the interference fit between them.

10. The quick-release arrangement according to claim 8, wherein the limit point is defined by a closed bottom end of the U-shaped channel, and wherein the engagement element is separated from the retaining portion by an upward movement in a direction opposite from that in which it is inserted into the U-shaped channel.

11. The quick-release arrangement according to claim 8, wherein the limit point lies below the retaining lip.

12. A hand tool comprising a quick-release arrangement according to claim 8.

13. The hand tool according to claim 12, wherein the tool is a tape measure.

* * * * *